US006910061B2

(12) United States Patent
Hu et al.

(10) Patent No.: US 6,910,061 B2
(45) Date of Patent: Jun. 21, 2005

(54) FRAMEWORK SYSTEM AND METHOD FOR TESTING SERVER PERFORMANCE UNDER MULTIPLE WORKLOADS

(75) Inventors: Xiao Wei Hu, Beijing (CN); Nan Feng, Nanjing (CN); Xiao Yan Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/759,837

(22) Filed: Jan. 11, 2001

(65) Prior Publication Data

US 2001/0016867 A1 Aug. 23, 2001

(30) Foreign Application Priority Data

Jan. 11, 2000 (CN) ........................................ 00100949 A

(51) Int. Cl.[7] .............................................. G06F 13/00
(52) U.S. Cl. ...................................................... 709/202
(58) Field of Search ................................ 709/200, 202, 709/203, 218, 219, 224; 717/100, 124; 702/182, 186

(56) References Cited

U.S. PATENT DOCUMENTS 5,790,425 A    8/1998  Wagle

FOREIGN PATENT DOCUMENTS

| JP | 06-177893 | 6/1994 |
| JP | 09-138777 | 5/1997 |
| JP | 09-244913 | 9/1997 |
| JP | 10-143401 | 5/1998 |
| JP | 10-187495 | 7/1998 |

OTHER PUBLICATIONS

Junrou Nose, Performance Estimation Technique of Information System (The Last), "Summary of Performance Estimation and Tool", LAN TIMES, May 1, 1998, SOFTBANK Corp., vol. 8, No. 5, pp. 152–156.

Tasturou Kitagou, "Automating Test for Distributed System and Enhancing Quality, ASQ, Tools Appearing One After Another", Nikkei Electronics, Sep. 23, 1996, Nikkei BP Corp., No. 671, pp. 135–140.

Kaoru Majima, Feature Article 2 on Pro Use 'Utility', "Application Test Tool", Nikkei Software, Aug. 24, 1998, Nikkei BP Corp., vol. 1, No. 3, pp. 122–129.

*Primary Examiner*—Robert B. Harrell
(74) *Attorney, Agent, or Firm*—Scully, Scott, Murphy & Presser; Rafael A. Perez-Pineiro

(57) ABSTRACT

The present invention discloses a framework system for testing server with mixed workloads and a test method thereof, comprising workload case configure utility interface which includes function that let the framework invoke the third party's workload configure utilities to define workload cases for various test purpose; and workload interface which includes function of workload setup, control and monitor. The advantage of the invention is that the third party can flexibly adds his workloads into the framework system via a workload case configure utility interface and a workload interface.

22 Claims, 4 Drawing Sheets

FRAMEWORK SYSTEM AND METHOD FOR TESTING SERVER PERFORMANCE UNDER MULTIPLE WORKLOADS

BACKGROUND OF THE INVENTION

1. Technical Field

This invention relates to a framework system and a method using the framework for testing server performance, and, in particular, for testing servers that have mixed workloads.

2. Prior Art

As servers become more and more powerful, it is possible to run multiple different workloads on one server. But because of the limits of available resources like CPU, memory, these workloads may interfere with each other. It is important for the server to have the ability to balance the workloads to satisfy the business needs of the company, so it is necessary to test and measure its ability before deploy it into production.

A typical benchmark system is shown in FIG. 1, it consists of a group of workload generator, a testing manager that collaborates whole testing and the tested server.

U.S. Pat. No. 5,790,425 disclosed a method for testing server in client/server environment, it can be used for client systems with different protocols and testing the response of the server under multiple workloads. But it does not have the ability to add third party workloads and testing according to the third party's specification.

SUMMARY OF THE INVENTION

An object of this invention is to provide a framework and a method for testing server performance under multiple workloads, which allow adding of third party workloads, and test the server ability according to the third party's specification.

To achieve the above object, this invention discloses a method to test a server with mixed workloads. In the testing, multiple client machines acting as agents and controlling devices are connected with the server under test via a network. The method includes following steps, a third party develops one or more workload configure utilities corresponding to one or more workload cases, each workload configure utility implementing an interface for workload case configure utility; the third party also develops one or more workload engines corresponding to one or more workload cases, each of the workload engines implementing a workload interface; the controlling device configuring workload cases by calling corresponding workload case configure utilities, the controlling device transferring the information collected during the configure process to the corresponding agent machines; then the agent machines control the workload engines through the standard interface to generate workload requests and send them to the server, and the controlling device gathers response data of the server from the agent machines and produces a testing report.

This invention also provides a framework for testing a server with multiple workloads. In this framework, multiple machines acting as agents and controlling devices are connected with the server under testing. The characteristic is that the controlling device has a controller to coordinate the components involved in the testing; the interface for workload case configure utility enables the workload case configure utilities developed by a third party to be added to the framework; the workload configure utilities can be used to describe detailed testing requirements; the adapters in agents can be used to receive commands and configure information from the controlling device and return the result to it; said interface of workload engine is used to enables the workload engines developed by the third parties to be added to this framework; and said workload engine receives command and configure information from the agent adapter, generates workload request, sends the requests to the server and receives response from it.

The invented framework enables new kinds of workload from third parties be added to the testing easily, no matter if the workload is a standard benchmark or a specialized application workload. So it can be used to test server performance with mixed workload.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
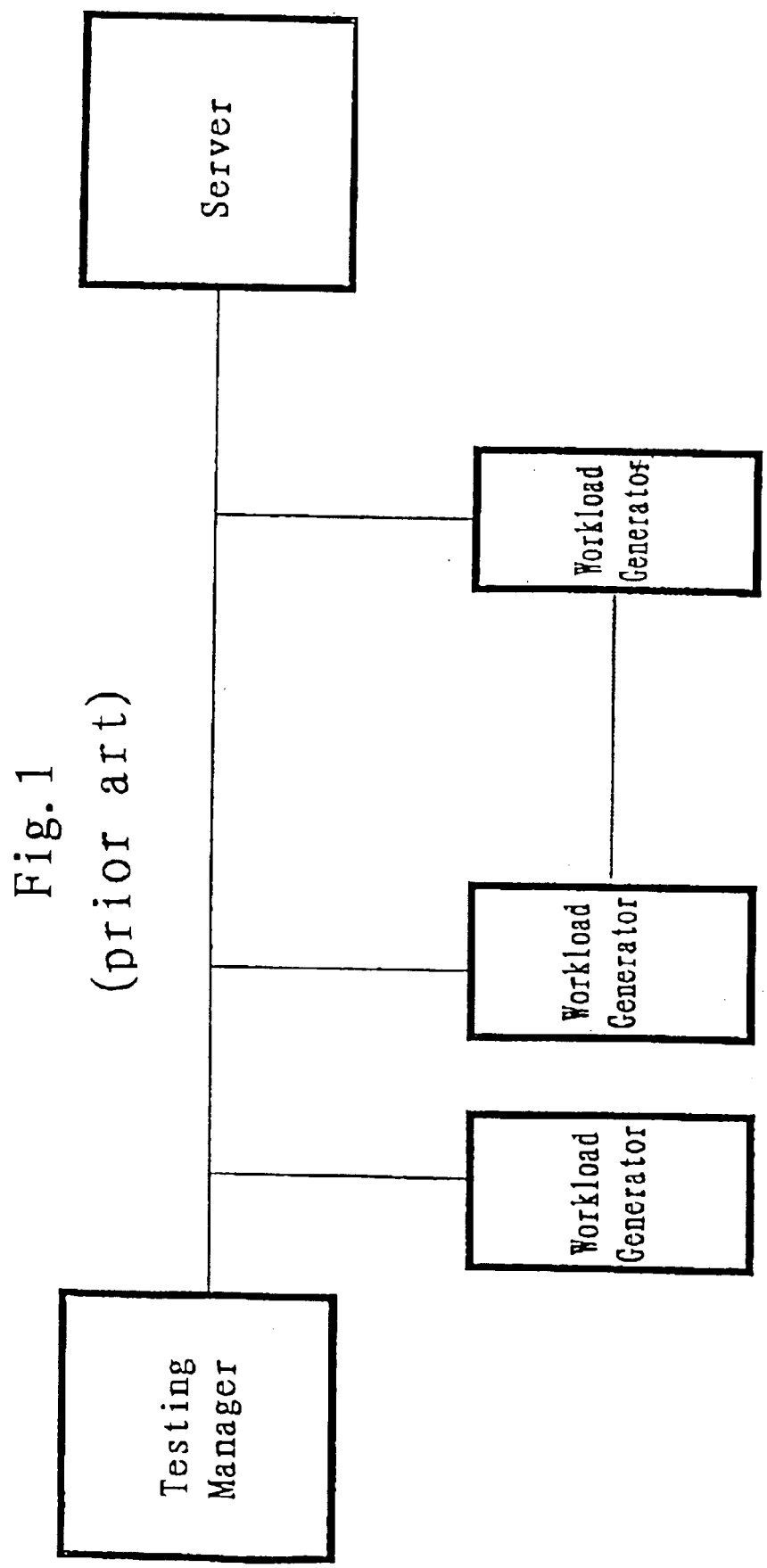
FIG. 1 shows a typical prior art testing system.
Figure 2:
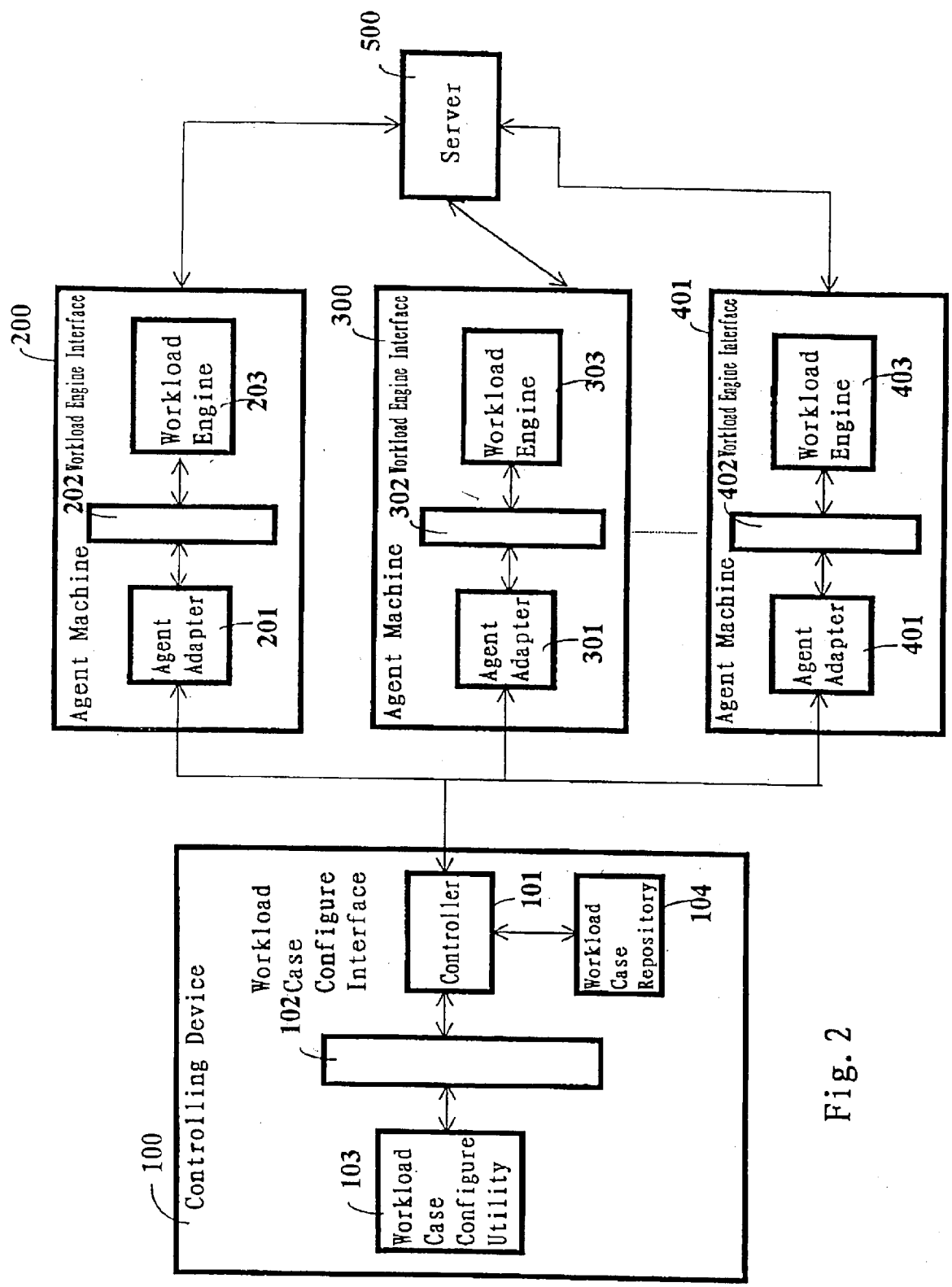
FIG. 2 is high level framework diagram of a testing system according to this framework of the invention.

The architecture of the disclosed testing framework is shown in FIG. 2. The controlling device 100 is the device to coordinate other components in the framework. The controller 101 is used to help the third parties to add their testing requirements into the framework. It is also responsible for communicating with the agents described below. The workload case configure interface 102 defines a interface with a set of functions that can be called by the controller 101, so the third parties can add their workload case easily. Although in one embodiment of this framework, the interfaces are implemented in Java, they can be implemented in any other programming languages. The workload case configure utility 103 is to be developed by a third party. It is used to configure a specific workload case. And by implementing all interfaces defined in the workload case configure utility interface 102, the configure utility can communicate with the controller 101. The workload case repository 104 is used to store all workload types defined by the third parties. The workload case configure utility 103 can be used to configure the workload cases stored in workload repository 104, and sends the information collected during the configuration process to the controller 101.

The agent machines 200, 300 . . . 400 are acting by the client machines connected by a LAN. They are used to simulate the users who send workload requests to the target server 500 under testing. The agent adapters 201, 301 . . . 401 are distributed on the agent machines. They are used to receive commands from the controller and control the workload engines (stated below) 203, 303, . . . 403 to generate the workload requests to drive the sewer. The workload engine interfaces 202, 302, 402 define a set of functions that can be called by the agent adapters 201, 301, . . . 401. These functions are to be implemented by the third party who want to use this framework for server testing. These functions include how to set and control the workload engines (stated below) and reporting results. In an embodiment of the framework, the interfaces are implemented in Java. They can also be implemented in other programming languages that are platform independent by third party programmers. The workload engines 203, 303, . . . 403 are implemented by the third party, it could generate workload requests based on the workload type defined by the third party and the testing configuration generated by the configure utility. The workload engines 203, 303 . . . 403 also implement these functions defined by workload interfaces 202, 302 . . . 402. So the workload engines 203, 303 . . . 403 can communicate with the agent adapters 201, 301 . . . 401.

Figure 3:
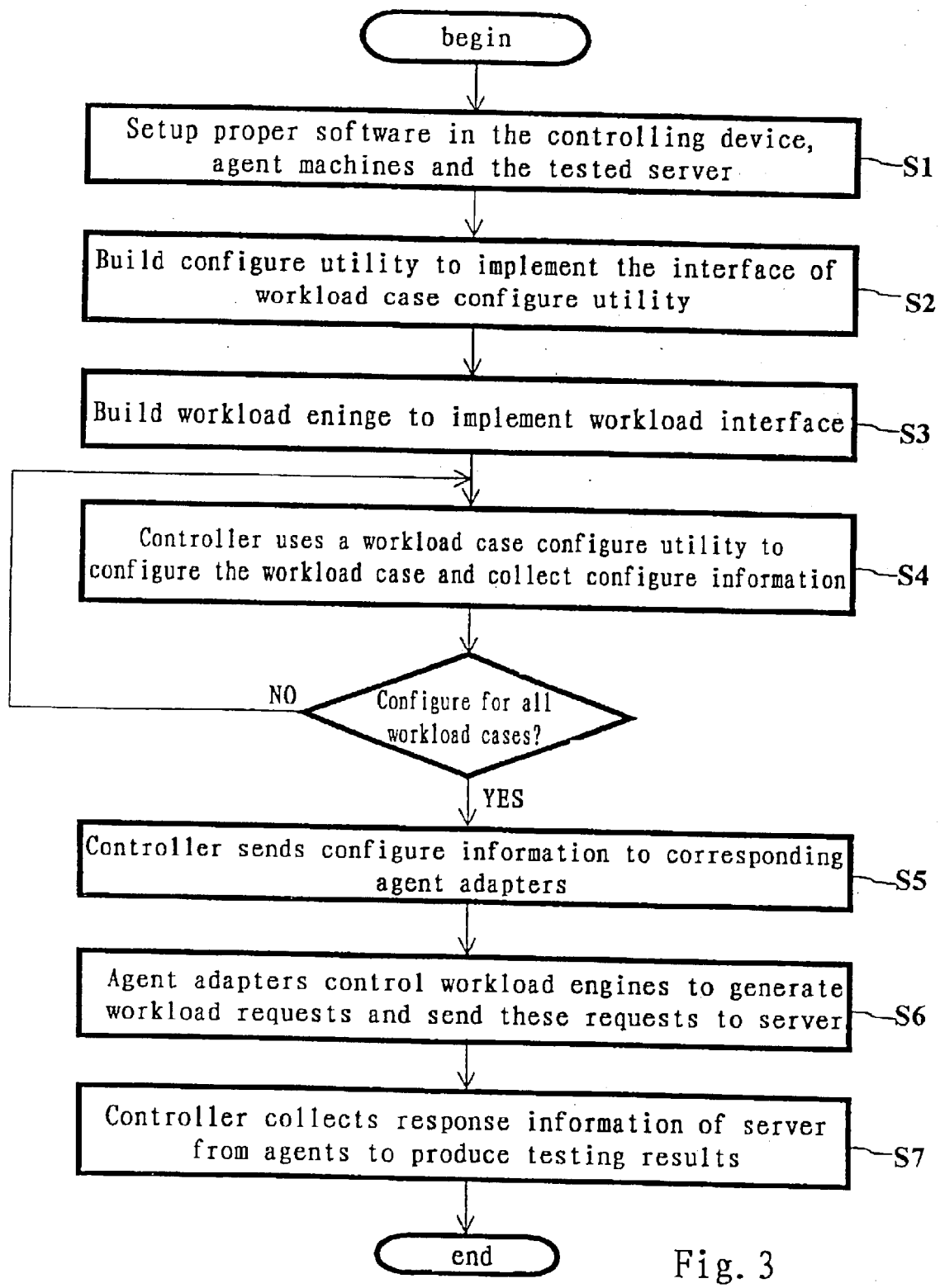
FIG. 3 is the flow chart of the method for using this framework to do server performance testing.

Above is an embodiment of the invented framework. Following explains the method which uses the framework described in FIG. 3 to test the response of the server to mixed workload.

First in step S1, the tester (third party) needs to setup proper software in the controlling device 100, agent machines 200, 300 . . . 400 and the tested server. These software should implement following functions: controller 101, agent adapter 201, 301 . . . 401. And the tester should store information about the workload configure utility, workload engine and the server applications to the workload repository 104, agent machines and server 500 respectively.

At step S2, the tester needs to build the configure utility 103 corresponding to the testing requirements and the workload case involved in the testing. The workload case configure utility 103 should implement the functions defined in the interface of workload case configure utility 102 to communicate with the controller 101.

At step S3, the tester needs to build the workload engine 203, 303 . . . 403 corresponding to the workload cases involved in the testing. The workload engines will generate workload requests based on the information of the workload case configuration. The workload engine 203, 303 . . . 403 need to implement the functions defined in workload interface 202, 302 . . . 402 to communicate with agent adapters 201, 301 . . . 401. In FIG. 2, the workload interface are labeled 202, 302, 402 for easy description, they have same set of functions.

At step S4, the controller 101 uses a corresponding workload case configure utility 103 through the workload case configure utility interface 102 to configure the workload case, and collect the information during this process. The tester can repeat the process in step 4 to configure multiple workload cases.

At step S5, the controller 101 sends the collected information to the corresponding agent adapters 201, 301 . . . 401.

At step S6, the agent adapters 201, 301 . . . 401 control the corresponding workload engines 203, 303 . . . 403 with workload interfaces 202, 302 . . . 402 to generate workload requests and send them to the server 500.

At step S7, the controller 101 dynamically collects response information of server 500 from the agents 201, 301 . . . 401 to produce testing result.

Although above discussion assumes that one agent machine has only one workload engine, it is possible to set up multiple workload engines on one agent machine.

The above discussion showed that the claimed framework can flexibly test server performance with mixed workloads. The flexibility is represented by using interfaces of the workload case configure utility and the workload engine, so third parties can add their own workloads to the test.

Following is an example shows how a third party can use this framework to do server performance test. It is assumed to test the response of an e-business site with mixed workloads.

Usually an e-business site (server) will have many kinds of workload, some of them are caused by casual browsing, some are generated by those who do business transactions. In most cases, the farmer is more likely than the later. That is, the number of casual browsing is more than the number of business transactions. If the site does not have adequate control, the casual browsing can degrad the performance of the business transactions. So a tester of e-business site may want to simulate real situation to see how the server will respond under different situations tn know how to control it.

To use the framework of this invention for testing, the tester should finish following tasks before testing.

Figure 4:
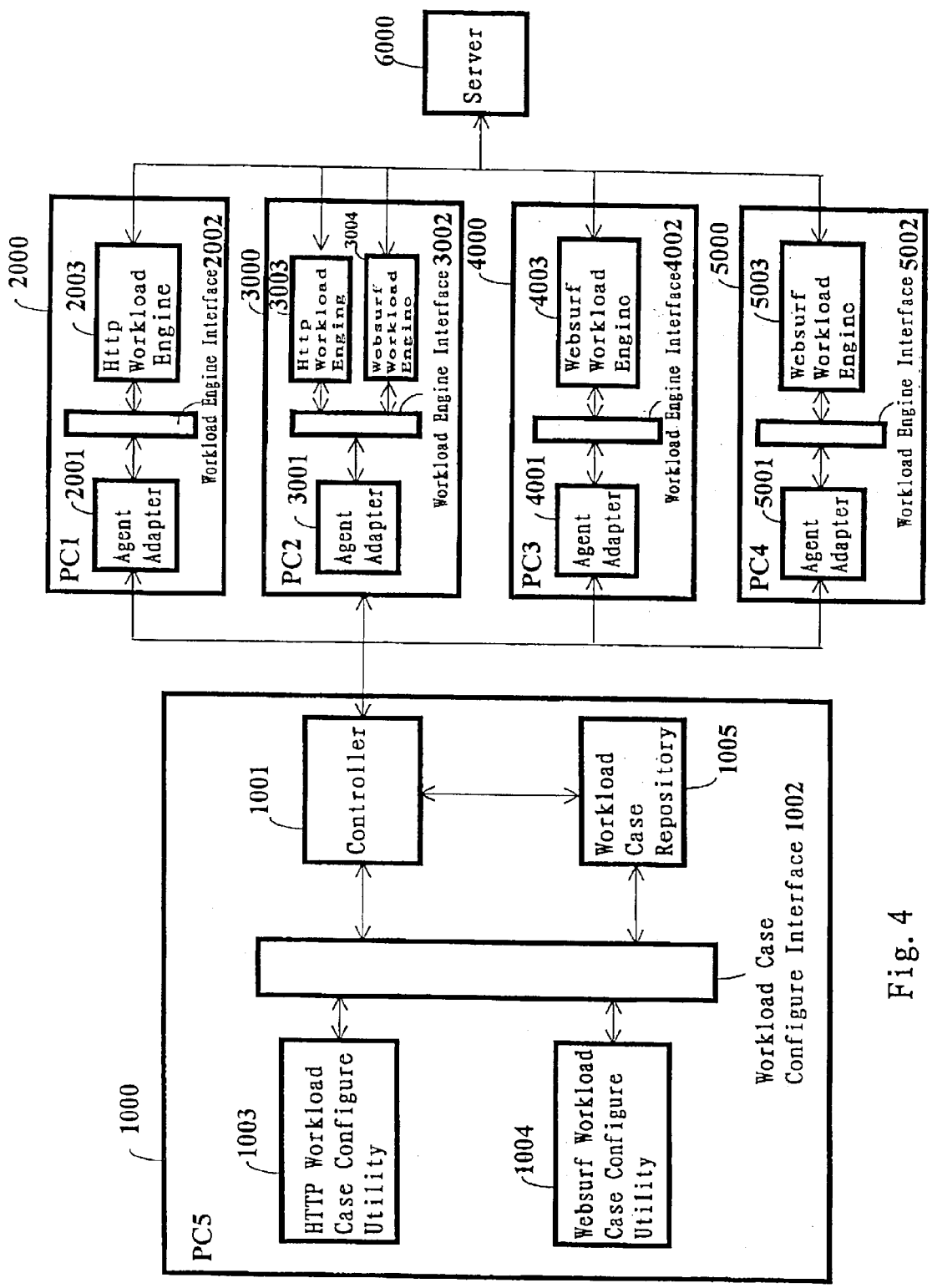
FIG. 4 is a block diagram of an embodiment of the framework.

1. Setup hardware environments for the testing, as shown in FIG. 4. Assumes the tester has a server 6000 for running the mixed workload, 5 PC (PC1–PC5). One of the PC (PC5) is as the controller, the other four PC (PC1–PC4) are as agents. They are connected together by network.

2. Load the software that implemented the functions of controller 1001 to controlling device 1000 (PC5). Load software that implemented the functions of agent adapter 2001–5001 to agent machine (PC1–PC4).

3. The tester defines the goal of the test. In this example, assume to run two kind of workload concurrently on the server, one kind of workload is HTTP, the other is websurf. Use PC1 and PC2 to simulate the request to generate HTTP workload, use PC2, PC3 and PC4 to simulate the request to generate websurf workload.

4. The tester stores related information (e.g. the parameters and instance of variables) for generating HTTP workload case to the workload repository 1005 on controlling device 1000.

5. Use the method in step 4 to store the related information about websurf workload to workload case repository 1005 on controlling device 1000.

6. The tester develops HTTP workload case configure utility 1003 corresponding to workload case HTTP. This utility should implement the interface of workload case configure defined in this disclosure, so that controller 1001 can call this utility 1003 through configure interface 1002 to configure workload. The tester can develop workload engine 2003, 3003 (they are the same) according to the HTTP workload specification. The workload engine 2003, 3003 should implement the interface for workload engine defined in this disclosure, so that the controller 1001 can control the workload engine 2003, 3003 through agent adapter 2001, 3001 to generate HTTP workload request. Then the tester loads the HTTP configure utility 1003 to controlling device 1000, loads the HTTP workload engine 2003, 3003 to PC1 and PC2. By this way, the tester have added HTTP workload into the disclosed framework through the interfaces of workload configure utility 1002 and workload engine 2003, 3003.

7. Same with step 6, the tester develops websurf workload case configure utility 1004 corresponding to that workload. This utility implements the workload case configure utility interface 1002 defined in this disclosure, so that the controller 1001 can use this utility 1004 to configure workload case through the workload load configure utility interface 1002. The tester can develop websurf workload engine 3004, 4003, 5003 (they are the same) based on the workload specification and related information. The workload engine 3004, 4003, 5003 implements the workload engine interface 3002, 4002, 5002, so that the controller 1001 can control them through the agent adapter 3001, 4001, 5001 to generate the websurf workload. Then the tester can load the websurf workload case configure utility to the controller 1001, and load the websurf workload engine 3004, 4003, 5003 to PC2, PC3 and PC4. The tester can add the workload case configure utility 1004 and the workload engine 3004, 4003, 5003 for websurf workload to the testing framework by implementing the workload case configure utility interface 1002 and the workload engine interface 3002, 4002, 5002.

To make the framework more easy to be understood, following shows sample interfaces defined in this invention using JAVA language.

The interface definition for workload case configure utility:
public interface iConfig {
  //* controller transfer the name of a workload case configure file to the workload case configure utility *//
    public void setConfigFileName(String strConfigFileName);
  //* configure workload case *//
    public Boolean show(frame parent) throws Exception;
  //* collect configure information *//
    public string[ ] get AllFilesNeedToBeSend( ); }
The interface definition for workload engine:
public interface iWorkload {
  //* the init code that preparing testing based on the parameters in the configure file */
    public void initWorkload(String configFileName) throws Exception;
  //* start testing *//
    public void start( ) throws Exception;
  //* end testing *//
    public void stop( ) throws Exception;
  //* set the number of simulated users on the agent machine, and the interval between workload requests *//
    public void setproperty(int nClientNumber, int nTime) throws Exception;
    //* change the number of simulated users *//
    public void change ClientNumber (int newClientNumber) throws Exception;
    //* dynamically report the statistics of server responses which include but not limited to the throughput, response time, connection numbers, number of errors, elapsed time from starting test. *//
    public CReturnValue getStandardValue( ) throws Exception;
    //* stop testing *//
    public boolean testFinish( ) throws Exception; }

The interface definitions are not restricted to the above examples, it can be added with new function.

Now the framework has been set up. Following shows how to use this framework to do testing.

A system implementing the framework is shown in FIG. 4. Following is the function of each modules and their relationships.

First, the tester start the controller 1001 to add a new workload case, the controller 1001 is used to select a workload from the list of all available workloads, HTTP for example. The workload list (not showed) can be generated from the workload repository 1004 by the controller 1001, or by the tester. Because the method to generate a list is well known, it is omitted here.

Then the controller 1001 uses the HTTP workload case configure utility 1003 through the workload case configure utility interface 1002. The HTTP workload case configure utility 1003 is used to configure the HTTP workload case, such as collecting the information required by the workload engine 2003, 3003 to generate workload requests, and transferring the information to the controller 1001. The information collected by the workload case configure utility 1003 can also be put into a HTTP workload case configuration file and stored in workload case repository 1005 to be used by the controller 1001. The configured workload case HTTP is also be add to a workload case list (not showed) used to store the workload cases that could be used in the test.

After configured the HTTP workload case, the controller 1001 configures the workload case of websurf workload, similar to the process in configuring the HTTP workload case. Then the information of configuration is transferred to the controller 1001 and/or stored in a configuration file for the websurf workload case, to be used by the controller 1001. And the workload case is also be added to the workload case list mentioned above.

Then the controller 1001 will designate agent machines for individual workload case to generate corresponding workload respectively. In this implementation example, the addresses of agent PC1 and PC2 are assigned to workload case HTTP, the addresses of PC2, PC3 and PC4 are assigned to workload case websurf. The addresses will be added to a machine list (not showed), which is used to store the addresses of agent for generating specific kind of workload requests. The controller 1001 also specify the number of simulated users for each agent, so that one agent can simulate multiple users to issue one kind of workload requests.

Then the controller 1001 starts the test by issue start command to PC1, PC2, PC3 and PC4. It also sends the configure information and number of users simulated on PC1 2000 for HTTP workload case to the agent adapter 2001 through the network, sends the configure information and number of users simulated on PC2 2000 for workload HTTP to agent adapter 3001 through the network; sends the configure information and number of simulated users on PC3 for websurf workload to agent adapter 4001 on PC3, sends the configure information and number of simulated user on PC4 for websurf workload to agent adapter 5001 on PC4.

The agent adapter 2001 on PC1 will transfer the configure information and the number of simulated users to the HTTP workload engine 2003 through the workload engine interface 2002, so that the engine could generate HTTP workload requests to the server 6000 and get response for statistic. The agent adapter 2001 can send the statistics result gathered by the workload engine 2003 to controller 1001. In same way, the controller can collect statistics results from the HTTP workload engine 3003, the websurf workload engine 3004, 4003 and 5003.

Finally, the controller 1001 produces and outputs the testing result from all collected information. In this embodiment the result is output in real time.

The controller 1001 can also send stop command to finish the test. Before the controller 1001 sending configure information to each agent machine, it could store all configure information including selected workload cases and machine lists to a file, so that the information can be reused without doing the configuration again in further tests.

There is also a workload engine repository to store the workload engines developed by the third parties for the controlling device.

While the invention has been particularly shown and described with respect to preferred embodiments thereof, it

What is claimed is:

1. A method for testing a server with mixed workloads, where multiple clients serving as agents and a controlling device are connected with a server under test via a network, said method comprising steps of:

developing one or more workload case configure utilities corresponding to one or more workload cases, each of said utilities implementing a workload case configure utility interface;

developing one or more workload engines corresponding to one or more workload cases, each of said engines implementing a workload engine interface;

said controlling device configuring woridad cases by calling corresponding ones of said workload case configure utilities through said workload case configure utility interface, and transferring the information collected during the configure process to corresponding agents;

each of said agents controlling a corresponding workload engine through said workload engine interface to generate multiple kinds of workload requests by using the information collected during the configure process, and sends concurrently sendinag said requests to the server; and, said controlling device collecting response information from all the agents, and generating test results.

2. The testing method according to claim 1, wherein said one or more workload case configure utilities are located in said controlling device, said one or more workload engines are located in one or more agents.

3. The testing method accordin claim 2, wherein said configuring workload cases step is implemented by a controller located in said controlling device, and said controller communicating with said agents.

4. The testing method according to claim 3, wherein said workload engines are controlled by agent adapters located in said agents and said adapters communicating with said controlling device.

5. The testing method according to claim 4, wherein each of said agent adapters sends the transferred information to corresponding workload engine; said workload engine scuds the response information to said agent adapter dynamically.

6. The testing method according to claim 3, wherein said configuring workload cases step further comprises steps of:

selecting one workload type from an available workload list;

activating a corresponding workload case configure utility according to the selected type;

said one or more workload case configure utility configure workload case corresponding to said workload type and transfering the configure information to said controller;

said controller designating network addresses of one or more agents which will generate workload requests corresponding to said workload case, and a client number simulated by each of said designated agents.

7. The testing method according to claim 6, wherein said workload case configure utility collects information for generating workload requests for said workload case.

8. The testing method according to claim 1, wherein said workload case configure utility interface includes function that let the framework invoke newly defined workload configure utilities to define new workload cases for various test purpose.

9. The testing method according to claim 1, wherein said workload interface includes function enabling workload setup, control and monitor.

10. The testing method according to claim 1, wherein said information collected during configure process at least includes workload case and its configure information, and a client number simulated by corresponding agent(s).

11. The testing method according to claim 1, further comprising the step of said controller controlling the start and the end of the test by sending commands to said agents.

12. A testing framework system for testing a server with mixed workloads, where multiple clients serving as agents and a controlling device are connected with a server under test via a network, wherein the controlling device comprises:

a controller for coordinating all multiple client agents;

a workload cue configure utility interface that enables development of one or more workload case configure utilities that can be incorporated into the framework system;

said workload case configure utilities allowing generation of specific test requirements, each of said multiple client agents comprising:

an agent adapter that receives commands and information from said controller and returns the server's response information to said controller;

a workload engine interface that enables development of one or more workload engines to be incorporated within said framework system, said workload engines receiving commands and information from said agent adapter to generate multiple kinds of workload requests, concurrently sending requests to the server and receiving response information from the server.

13. The framework system according to claim 12, wherein said controlling device further comprises, a workload case repository that stores the developed workload cases and the information collected during configure process.

14. The framework system according to claim 13, wherein said conirolling device further comprises, a workload engine repository that stores the developed workload engines.

15. The framework system according to claim 12, wherein said workload case configure utility interface includes a function that enables the framework to invoke newly defined workload case configure utilities to define new workload cases for various test purpose.

16. The framework system according to claim 12, wherein said workload engine interface includes a function enabling workload case setup, control and monitor.

17. The framework system according to claim 12, wherein said controller device further comprises, a configures workload cases by calling said workload case configure utilities through said workload case configure utility interface, designates network addresses of one or more agents which will generate workload requests for individual configured workload cases and a client number simulated by each of said designated agents, and then transfers the information collected during the configure process to corresponding one or more agent adapters.

18. The framework system according to claim 12, wherein said workload case configure utilities collect information for generating workload requests for said workload cases respectively.

19. The framework system according to claim 12, wherein said information collected during configure process at least includes workload case and its configure information, and a client number simulated by corresponding agent(s).

20. The framework system according to claim 12, wherein said controller controls the start and the end of the test by sending commands to client agents.

21. The framework system according to claim 12, wherein said controller receives the response information from said agent adapters dynamically.

22. The framework system according to claim 12, wherein each of said agents has at least one workload engine.

* * * * *

UNITED STATES PATENT AND TRADEMARK OFFICE
CERTIFICATE OF CORRECTION

PATENT NO. : 6,910,061 B2
APPLICATION NO. : 09/759837
DATED : June 21, 2005
INVENTOR(S) : Xiao Wei Hu et al.

It is certified that error appears in the above-identified patent and that said Letters Patent is hereby corrected as shown below:

Column 7, Lines 25-26, Claim 1:
"and sends concurrently sendinag" should read --and concurrently sending--.

Column 7, Lines 44-45, Claim 5:
"engine scuds the response" should read --engine sends the response--.

Column 8, Line 43, Claim 14:
"said conirolling device" should read --said controlling device--.

Column 8, line 54-55, Claim 17:
"wherein said controller device further comprises, a"
             should read
--wherein said controller configures--.

Column 9, Lines 1-2, Claim 19:
"wherein said infonnation" should read --wherein said information--.

Signed and Sealed this

Eleventh Day of July, 2006

JON W. DUDAS
*Director of the United States Patent and Trademark Office*